United States Patent Office 3,036,910
Patented May 29, 1962

3,036,910
SYNTHETIC FERRO-TITANIUM BRIQUETTE
Walter W. Eichenberger, 921 Liberty St., Erie, Pa.
No Drawing. Filed Mar. 13, 1958, Ser. No. 721,082
1 Claim. (Cl. 75—44)

This invention relates to briquettes of metallic content and, more particularly, to briquettes formed of sponge iron titanium scrap for use as a ferro-titanium.

This application is a continuation in part of patent application, Serial No. 625,630, filed December 3, 1956, which issued as Patent No. 2,837,773 on June 10, 1958.

In the parent application, a process is disclosed for utilizing titanium scrap, particularly titanium turnings utilizing iron sponge as a matrix, which were briquetted in a press.

Titanium turnings have a very low commercial value as compared with ferro-titanium which has a relatively high commercial value. By carrying out the present invention, titanium scrap and turnings can be marketed as ferro-titanium.

The present invention contemplates the use of a sponge iron in combination with titanium turnings or scrap to form a briquette to serve as a ferro-titanium. This ferro-titanium can also utilize off grade scrap and turnings in combination with iron sponge or direct iron made from iron ore by direct reduction. Ferro-titanium is used in metallurgical processes for control of grain size and, also, as an alloy in stainless steel.

Accordingly, it is an object of this invention to provide a method of briquetting titanium in combination with iron sponge to provide a ferro-titanium.

Another object of the invention is to provide a briquette of titanium made up of titanium turnings and scrap mixed with iron sponge.

A further object of this invention is to provide a method of briquetting titanium turnings.

The above objects and others which may be later referred to, together with others apparent to those skilled in the art, may be attained by carrying out the invention in the manner hereinafter described in detail.

In carrying out this invention to produce the briquettes from any desired titanium turnings or scrap, a quantity of titanium turnings or scrap thoroughly mixed with iron sponge is put into a briquetting press. Pressure of the briquetting press is then exerted on the mixture of sponge and scrap and the mixture is compressed into a heterogeneous briquette wherein the sponge acts as a matrix for holding the titanium in place in the briquette and the process results in a durable briquette of desirable density.

While, frequently, titanium turnings contain elements other than titanium in minor proportions, the only elements objectionable in ferro-titanium for the usual alloying additive for steel are zinc and tin. As long as these two elements are not present in appreciable quantities, the presence of other elements in minor proportions are not objectionable in the usual steel alloy.

An example of the proportions of titanium turnings and iron sponge which may be used together to form a briquette according to the invention is:

Titanium turnings or titanium alloy turnings _____ 25% to 60% by weight.
Iron sponge _____ 40% to 75% by weight (see note).

NOTE.—If less than forty percent sponge is used, an insufficient matrix is provided. It is impractical to use more than seventy-five percent sponge since, at this point, the briquette becomes predominantly sponge and, therefore, predominantly iron.

The above percentages are based on the use of titanium scrap or turnings which contain at least ninety-nine percent titanium. For scrap containing other elements, the lower limit of twenty-five percent should be increased by the amount of the other elements.

Briquettes made in the manner of the example have sufficient strength to withstand severe abuse at normal and even rough handling and at normal handling and transportation temperatures.

The foregoing specification sets forth the invention in its preferred practical forms but the method described is capable of modification within a range of equivalents without departing from the invention which is to be understood is broadly novel as is commensurate with the appended claim.

The embodiments of the invention in which an exclusive property or privilege is claimed are defined as follows:

A method of forming an alloying material for use as ferro-titanium comprising providing titanium scrap in its unannealed form being substantially free of zinc and tin, mixing said titanium scrap with iron sponge in the proportions of between twenty-five percent and sixty percent by weight of titanium scrap and between forty percent and seventy-five percent iron sponge, said sponge forming a matrix for said scrap, and pressing said scrap and said sponge together at high pressures whereby said scrap and said sponge are formed into a briquette with said sponge forming a matrix for said scrap for use as a ferro-titanium additive to metal.

References Cited in the file of this patent
UNITED STATES PATENTS

| | | |
|---|---|---|
| 1,017,620 | Campbell | Feb. 13, 1912 |
| 1,698,300 | Ehlers | Jan. 8, 1929 |
| 1,922,037 | Hardy | Aug. 15, 1933 |
| 1,996,220 | Tigrschiold et al. | Apr. 2, 1935 |
| 2,837,773 | Eichenberger | June 10, 1958 |